UNITED STATES PATENT OFFICE.

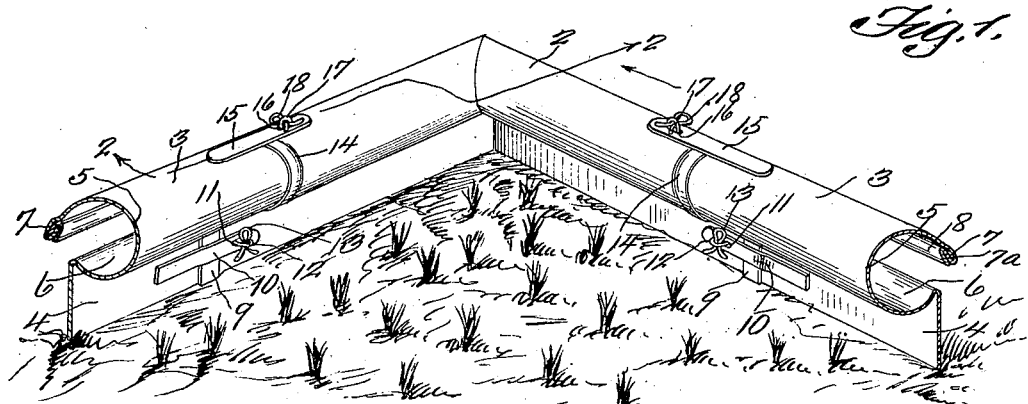

JOHN NELSON AND ROBERT WATSON, OF PASADENA, CALIFORNIA.

COMBINED FENCE, PLANT-PROTECTOR, AND INSECT-DESTROYER.

1,373,827.   Specification of Letters Patent.   Patented Apr. 5, 1921.

Application filed September 25, 1920. Serial No. 412,800.

*To all whom it may concern:*

Be it known that we, JOHN NELSON and ROBERT WATSON, citizens of the United States, residing at Pasadena, in the county of Los Angeles and State of California, have invented certain new and useful Improvements in Combined Fences, Plant-Protectors, and Insect-Destroyers, of which the following is a specification, reference being had to the accompanying drawings.

The purpose of the present invention is to provide a device for preventing the approach or egress of destructive insects, such as snails and the like to growing crops, and for destroying such insects.

In order to accomplish the destruction of such insects as well as preventing the approach of them to the growing plants, it is the aim to provide an upstanding fence or protector, to be constructed of any suitable material preferably of sheet metal to be arranged around the plants or crops, the upper part of the wall terminating in a cylindrical portion, which extends inwardly and downwardly, and then curves outwardly and terminates so that its marginal portion may be spaced from the upper edge of the wall, and slightly overhanging in an offset position, in order to shed the water from the trough formed by the circular portion, and also to cause the insect to be returned to the ground beyond the wall.

Furthermore, a suitable insect destroying powder, such as Gold Dust washing powder or the like may be deposited within the trough, for the purpose of destroying the insects, such as snails and the like, hence preventing them from reaching the plants, though they may reach the interior of the trough, which is formed by the cylindrical upper portion of the wall.

Still further, the invention provides the construction of the wall in sections, so that the fence or protector can be assembled, and may be increased or decreased in size.

In order to maintain the sections in place, the invention contemplates the provision of means for securing the sections together, said means comprising straps carried by certain of the sections and overlying the adjacent ends of the other sections and receiving projecting eyes or staples, which in turn receive keys, to lock the sections.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective of a portion of a fence or protector, showing the same in a position to protect young growing plants or crops, Fig. 2 is a longitudinal sectional view on line 2—2 of Fig. 1, showing the construction for securing two sections together.

Fig. 3 is a longitudinal sectional view on line 3—3 of Fig. 2.

Referring more especially to the drawings, 1 designates the fence or protector as a whole, which may be any size, it depending entirely upon the area of ground taken up by the young plants or crops. Preferably the fence or protector is constructed in rectangular form and of sheet metal, and also consists of corner sections and intermediate sections 2 and 3. However, each section comprises a vertical wall 4, which merges into a cylindrical wall 5 at the top, and which extends within the fence. This cylindrical wall has its lower portion positioned on the plane below the upper edge of the vertical portion of the section, and constitutes a trough 6, adapted to contain any suitable insect destroying powder, such as Gold Dust washing powder or the like. The marginal portion of the upper part of the wall is spaced above the upper edge of the vertical portion of the upper fence of the wall, and is also offset outwardly a slight distance beyond the upper marginal portion of the vertical portion of the fence or wall, thereby not only acting to shed the water from the interior of the trough, but also acting to cause the return of the insects or snails to the ground, should they crawl upon the inner surface of the trough until they reach the overhanging edge. This marginal portion has a strengthening or stiffening rib 7, the construction of which embodies the bending out of the marginal portion of the overhanging portion of the upper part of the cylindrical wall or trough, and providing a return portion $7^a$, thereby forming a channel, which receives a metallic stiffening piece 8, which is U-shaped in cross section. One portion of this stiffening piece 8 engages the channel, after which such parts are clenched together firmly, thereby affording a stiffening rib. The rib also acts to cause the water to shed upwardly and beyond the vertical portion of the wall or fence.

In order to fasten the sections together, the vertical portion of the fence or wall has an offset portion 9, as shown clearly in Fig. 3, and to be engaged by the adjacent edge of the vertical portion of an adjacent section of the fence or protector, thereby not only assisting in holding the sections relatively rigid, but also acting to cover the joint of the vertical portions of two adjacent sections. A suitable strap 10 is connected to one face of the vertical portion of one section, as by means of soldering or the like, and is positioned so as to overlie the offset part of an adjacent section. This strap 10 has a slot 11, for the reception of the staple 12, which projects laterally from the vertical portion of an adjacent section of the fence. A key 13 engages the staple and holds the strap in position, as well as latching the two sections in place.

The interior surface of the upper portion of the cylindrical trough or wall of the fence also has an offset portion 14, which overlaps the adjacent edge of the upper portion of the cylindrical wall of the trough, to assist in holding the portions relatively positioned. A strap 15 is carried by the exterior of the upper portion of the cylindrical wall and overlies the edge or surface of the cylindrical wall of an adjacent section and has a slot 16 for the reception of a staple 17, which also receives the key 18, thereby additionally securing the sections together and relatively reinforcing them.

The fence or protector is built up in sections, as shown in Fig. 1, it being understood that in practice the fence or protector will be complete, in rectangular formation, instead of the simply angular portion as illustrated. It is obvious that should an insect, such as a snail or the like approach the protected plants or crops, it would reach the fence or protector, and then crawl up the exterior face of the vertical portion of the fence or wall and then into the trough, where it will be destroyed by the insect powder. However, should the insect get past the destroying powder and then travel the cylindrical surface, it would finally reach the marginal portion of the upper portion of the cylindrical wall, and be returned to the ground.

The invention having been set forth, what is claimed as new and useful is:—

1. In a protecting fence for young plants or crops, a vertical portion terminating at its upper part in a cylindrical trough-like wall having its marginal portion spaced from and offset outwardly beyond the upper marginal portion of the vertical portion of the fence, thereby acting to shed the water from the interior of the trough.

2. In a protecting fence for young plants or crops, a vertical portion having at its upper marginal portion a trough extending inwardly and downwardly of the protecting fence, said trough having a roof having its marginal portion spaced above and offset outwardly beyond the upper marginal portion of the vertical portion of the fence, thereby acting to shed the water from the interior of the trough, which is designed to contain an insect destroying powder.

3. In a fence for protecting young plants or crops, a vertical fence portion provided with a trough at its upper marginal portion, said trough having an over-hanging roof, said protecting fence being constructed in sections, and means for detachably connecting the sections together, the marginal portion of the roof being spaced above and offset outwardly beyond the upper marginal portion of the vertical portion acting to shed water from the interior of the trough.

4. In a fence for protecting young plants or crops, a vertical fence portion provided with a trough at its upper marginal portion, said trough having an over-hanging roof, said protecting fence being constructed in sections, means for detachably connecting the sections together, the marginal portion of the roof being spaced above and offset outwardly beyond the upper marginal portion of the vertical portion acting to shed water from the interior of the trough, said means comprising a strap carried by one section and overlying the wall of an adjacent section, said overlying part having a slot, and means extending through the slot and held therein, for holding the sections together.

5. In a fence for protecting young plants or crops, a vertical fence portion provided with a trough at its upper edge, said trough having an over-hanging roof, said protecting fence being constructed in sections, means for detachably connecting the sections together, the edge of the roof being spaced above and offset outwardly beyond the upper edge of the vertical portion acting to shed water from the interior of the trough, said means comprising a strap carried by one section and overlying the wall of an adjacent section, said overlying part having a slot, means extending through the slot and held therein, for holding the sections together, and means covering the joint between the sections, to prevent the passage of water excessively therethrough.

In testimony whereof we hereunto affix our signatures.

JOHN NELSON.
ROBERT WATSON.